(12) United States Patent
Yu

(10) Patent No.: US 10,934,464 B2
(45) Date of Patent: Mar. 2, 2021

(54) FLAMELESS AUTOMATIC FOOD HEATING AGENT AND METHOD THEREOF

(71) Applicant: Mingfu Yu, Zhejiang (CN)

(72) Inventor: Mingfu Yu, Zhejiang (CN)

( * ) Notice: Subject to any disclaimer, the term of this patent is extended or adjusted under 35 U.S.C. 154(b) by 253 days.

(21) Appl. No.: 16/026,048

(22) Filed: Jul. 3, 2018

(65) Prior Publication Data

US 2018/0312737 A1 Nov. 1, 2018

(30) Foreign Application Priority Data

Sep. 20, 2017 (CN) .......................... 2017 1 0854268

(51) Int. Cl.

| | | |
|---|---|---|
| *F24C 15/04* | (2006.01) | |
| *F24C 15/02* | (2006.01) | |
| *C09K 5/18* | (2006.01) | |
| *A47J 36/28* | (2006.01) | |
| *A23L 5/10* | (2016.01) | |
| *B65D 81/34* | (2006.01) | |
| *F24V 30/00* | (2018.01) | |

(52) U.S. Cl.
CPC ................. *C09K 5/18* (2013.01); *A23L 5/10* (2016.08); *A47J 36/28* (2013.01); *B65D 81/3484* (2013.01); *F24V 30/00* (2018.05)

(58) Field of Classification Search
CPC .......... F24V 30/00; A47J 36/28; B65D 81/34; F24C 5/02; F24C 15/04
See application file for complete search history.

(56) References Cited

U.S. PATENT DOCUMENTS

| | | | | |
|---|---|---|---|---|
| 3,766,079 | A * | 10/1973 | Jackman et al. | B29C 65/022 126/263.01 |
| 4,114,591 | A * | 9/1978 | Nakagawa | F24V 30/00 126/263.02 |
| 5,984,953 | A * | 11/1999 | Sabin | A61F 7/03 607/114 |
| 6,200,357 | B1 * | 3/2001 | Nakajima | C09K 5/18 126/263.05 |

(Continued)

FOREIGN PATENT DOCUMENTS

CN 104555116 A * 4/2015 ............. B65D 81/34

OTHER PUBLICATIONS

English machine translation of CN1045551 A by Huichao et al, Self-heatingdisaster-proof . . . of Apr. 29, 2015, all pages.*

*Primary Examiner* — David J Laux
*Assistant Examiner* — Nikhil P Mashruwala

(57) ABSTRACT

The formula of the flameless automatic food heating agent comprises 1 to 5 parts of aluminum powder, 3 to 10 parts of carbon powder, 5 to 25 parts of magnesium powder, 10 to 25 parts of iron powder and 1 to 5 parts of anticoagulant. The preparing of the flameless automatic food heating agent bags (3) comprises the following steps: placing two pieces of food heating agent bags (3) in two sides of a sealed food packaging (2) before putting into a water-proof heating bag (1); adding water into the water-proof heating bag (1) to let food heating agent bags (3) to absorb water; bending an opening side of the water-proof heating bag (1) to seal the opening side; vaporizing water in the water-proof heating bag (1); placing the water-proof heating bag (1) for 10 to 15 minutes; heating food in the sealed food packaging (2) to 60° C. to 80° C.

3 Claims, 6 Drawing Sheets

(56) References Cited

U.S. PATENT DOCUMENTS

| | | | |
|---|---|---|---|
| 6,247,469 B1 * | 6/2001 | Guard | A63B 71/0045 |
| | | | 126/263.01 |
| 6,629,964 B1 * | 10/2003 | Ono | A61F 7/03 |
| | | | 602/48 |
| 7,537,002 B2 * | 5/2009 | Handa | A47J 36/28 |
| | | | 126/263.01 |
| 9,671,134 B2 * | 6/2017 | Saita | A61F 7/034 |
| 2011/0048446 A1 * | 3/2011 | Torgerson | A61K 8/738 |
| | | | 132/202 |
| 2012/0030992 A1 * | 2/2012 | Bommaraju | H01M 6/32 |
| | | | 44/253 |

* cited by examiner

FLAMELESS AUTOMATIC FOOD HEATING AGENT AND METHOD THEREOF

CROSS REFERENCE OF RELATED APPLICATION

This application claims priority under 35 U.S.C. 119(a-d) to CN 2017108542685, filed Sep. 20, 2017.

BACKGROUND OF THE PRESENT INVENTION

Field of Invention

The present invention relates to self-heating food packaging technology, and more particularly to a flameless automatic food heating agent and method thereof

Description of Related Arts

The Chinese application CN201410752788.1 (Self-heating disaster-proof emergency food package and heating method thereof) discloses a self-heating disaster-proof emergency food package and a heating method thereof. The self-heating disaster-proof emergency food package comprises a heat-insulating shell and a self-heating bag, wherein the heat-insulating shell is made of aluminum complex foil pearl wool; the self-heating bag is prepared by arranging a self-heating element in a sealing bag; a mixture of calcium oxide and aluminum powder or magnesium powder serves as the self-heating element; the self-heating bag is wrapped in the heat-insulating shell; a water bag is also arranged in the heat-insulating shell; food with a sealing package is arranged in the heat-insulating shell. During a use process, two heating bags are taken out and are respectively placed on the two sides of the food with the sealing package and are put into the heat-insulating shell, the water bag with metering scales is opened, and then water, the mass of which is 2-3 times of the mass of the self-heating element, is poured onto the self-heating bag, the self-heating bag absorbs water, and then the longer side of the opening port of the heat-insulating shell is bent toward the shorter side so that the opening port of the heat-insulating shell is sealed, and then the sealing is kept for more than 15 minutes till reaching the proper temperature, so that the heating is finished. The disadvantages of the invention are as follow: the method is not applicable in a frigid weather or environment due to the water is easily frozen; the mixture of calcium oxide and aluminum powder or magnesium powder is easily caking under an environment of 20-30° C. below zero; the mixture is not able to fully contact with the water if the water is poured into the self-heating bag after being melted, which causes unfavorable heating effect; the reactants in the self-heating bag exude out, which is insanitary. The formula of the self-heating disaster-proof emergency food package needs improving.

SUMMARY OF THE PRESENT INVENTION

An object of the present invention is to provide the flameless automatic food heating agent which is able to work under low temperature.

A solution of the present invention is as follow. A flameless automatic food heating agent, wherein a formula of the flameless automatic food heating agent comprises one part to five parts of aluminum powder, three parts to ten parts of carbon powder, five parts to twenty five parts of magnesium powder, ten parts to twenty five parts of iron powder and one parts to five parts of anticoagulant.

Optionally, the anticoagulant is able to be selected from a group consisting of sodium chloride, sodium citrate or potassium fluoride for improvement. The anticoagulant is able to be other known anticoagulants, which depends on different applications.

Optionally, the magnesium powder, the aluminum powder, the iron powder and the carbon powder are able to be nanomaterial or materials which are finer than the nanomaterial for improvement.

The second object of the present invention is to provide a method which adopts the flameless automatic food heating agent to heat food under low temperature.

The solution of the present invention to achieve the second object is the method of heating foods with the flameless automatic food heating agent, which comprises the following steps.k a) The preparing of the flameless automatic food heating agent: selecting a non-toxic bag which is able to absorb water and filer water molecules while keeping the solid powder; mixing all components to a mixed powder according to the formula of the flameless automatic food heating and put the mixed powder into a non-toxic bag; sealing the non-toxic bag to produce the flameless automatic food heating agent bag. The non-toxic bag adopts the know technology. The non-toxic bag is able to be made of non-woven cloth which absorbs water or other material with permeable membrane. The bag is non-toxic.

b) Placing two pieces of flameless automatic food heating agent bags in two sides of a sealed food packaging respectively; putting the sealed food packaging with the flameless automatic food heating agent bags into a water-proof heating bag; adding water into the water-proof heating bag to let the flameless automatic food heating agent bags to absorb water.

c) Bending an opening side of the water-proof heating bag to seal the opening side; vaporizing water in the water-proof heating bag; placing the water-proof heating bag for 10 to 15 minutes; heating food in the sealed food packaging to 60° C. to 80° C.

Optionally, the step b) further comprises the following steps for improvement: placing the water-proof heating bag filled with water and two pieces of the flameless automatic food heating agent bags in a protective bag which is thermal keeping, burn-proof and heat insulating to absorb water and for heating; bending and inserting the opening side of the water-proof heating bag into the protective bag to automatically fix and seal an opening of the water-proof heating bag. Heating food is safe and convenient in this way.

Optionally, the water-proof heating bag is a plastic bag which is able to endure a temperature of 150° C. to 160° C., a water-proof foam pouch or a rubber bag. The plastic bag is able to be transparent or opaque.

Optionally, the protective bag is able to adopt the foam pouch made of foam material for improvement. The protective bag is also able to adopt thick transparent plastic bag or other opaque material which is heat insulating and thermal keeping.

Optionally, the flameless automatic food heating agent bags in the step (a) comprise n small bags which contain the mixed powder; the n is a natural number more than two. The contact area of the flameless automatic food heating agent bag and the sealed packing food is bigger in this way, which accelerates the heating process and shortens the time required.

Optionally, the water-proof heating bag is turned over every 5 minutes in the 10 to 15 minutes in the step c), which enables an even distribution of heat and accelerates the heating.

Optionally, the water is purified water, solution, turbid water or urine or other water sources found outdoor.

Compared to the conventional technology, the advantages of the present invention are as follow: the anticoagulants are added in the flameless automatic food heating agent to prevent caking under 30° C. below zero and enable the water fully contacting with the flameless automatic food heating agent for chemical reaction to heat food with the generated high pressure vapor under low temperature, which is the core of the present invention. The flameless automatic food heating agent adopts nanomaterial of magnesium, iron and carbon, which rapidly release heat when meets water. The heating temperature is high. The particles of the heating agent are small and are able to heat the food evenly. The time for heating food is shortened. The food and the heating bag are inside the protective bag which is small, light in weight and easy to carry. The food is able to be heated by peeling off the heating bag and then adding water. No extra heating devices are needed. The flameless automatic heating agent bag in the present invention is able to absorb water while preventing the reactants from exuding. The present invention is environment friendly and sanitary. The water in the present invention is able to be any water sources, such as purified water, solution, turbid muddy water or even urine when there is no other choice. The present invention is ideal for emergency, disaster relief and route march. The present invention adopts nanomaterial of aluminum, magnesium, iron and carbon added with anticoagulants, which is able to rapidly heat food evenly in a short time. The present invention is environment friendly, easy to use and able to work under low temperature and in a terrible environment.

DETAILED DESCRIPTION OF THE PREFERRED EMBODIMENT

Figure 1:
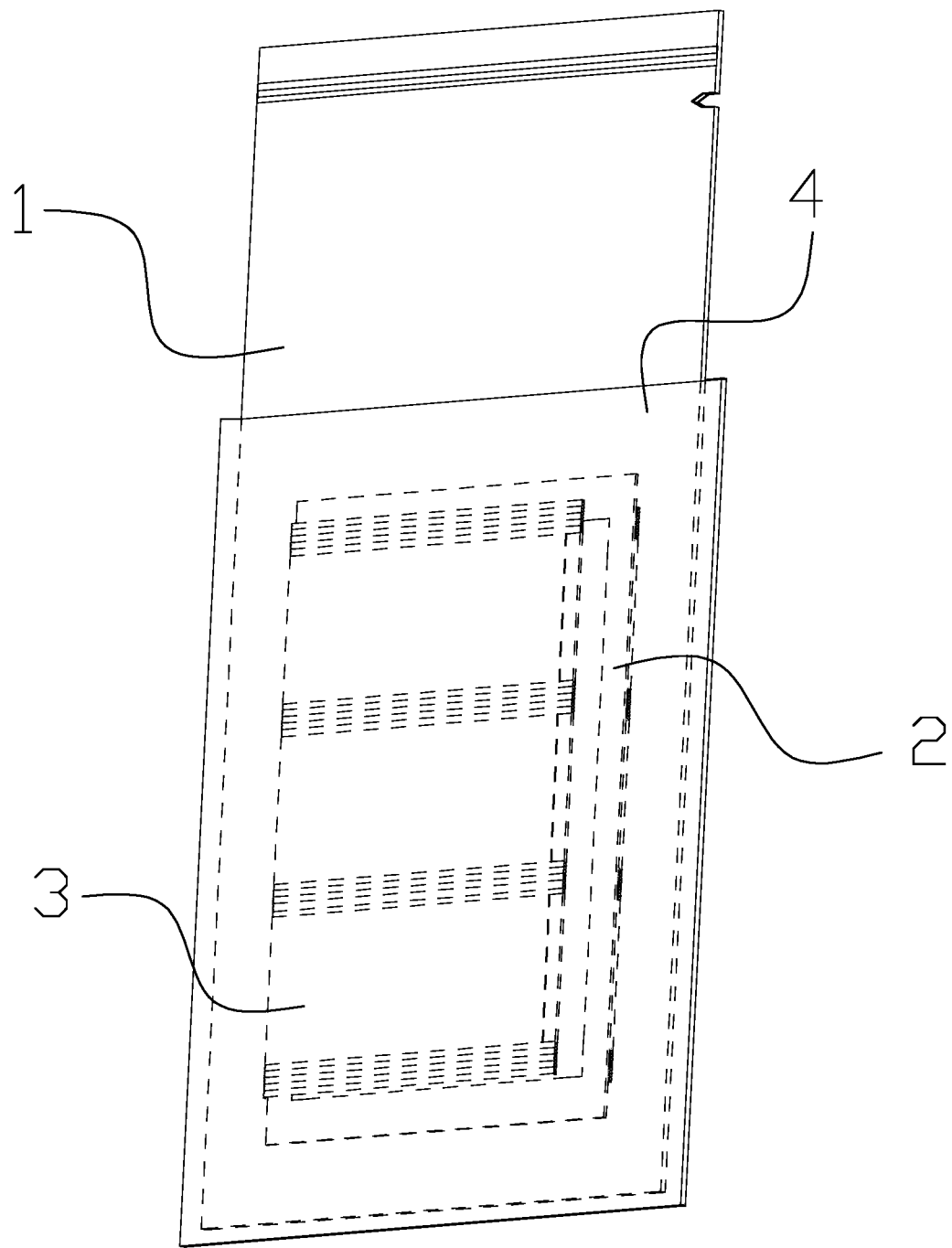
FIG. 1 is a perspective view of an embodiment of the present invention.
Figure 2:
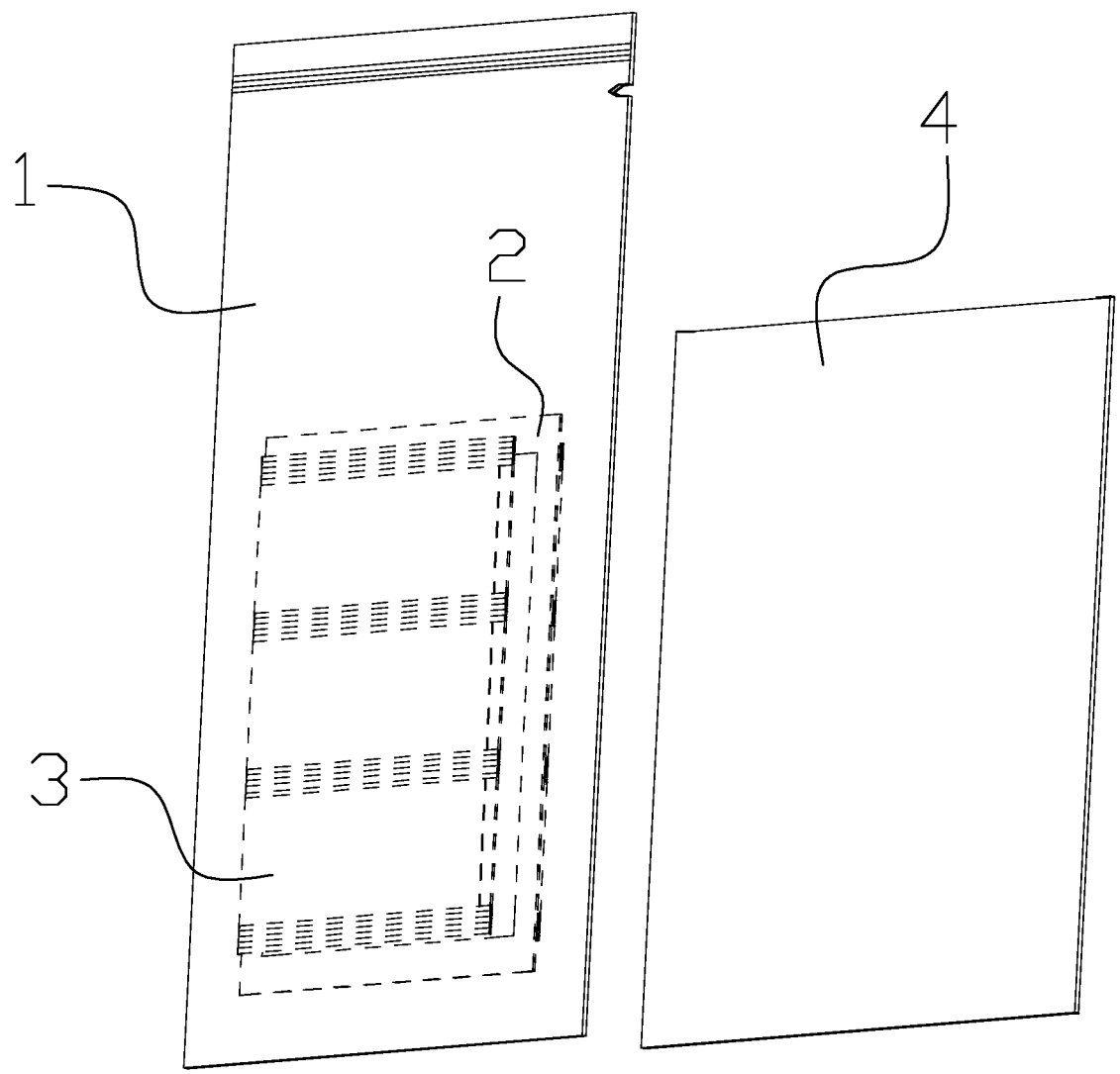
FIG. 2 is an explosive view of the FIG. 1.
Figure 3:
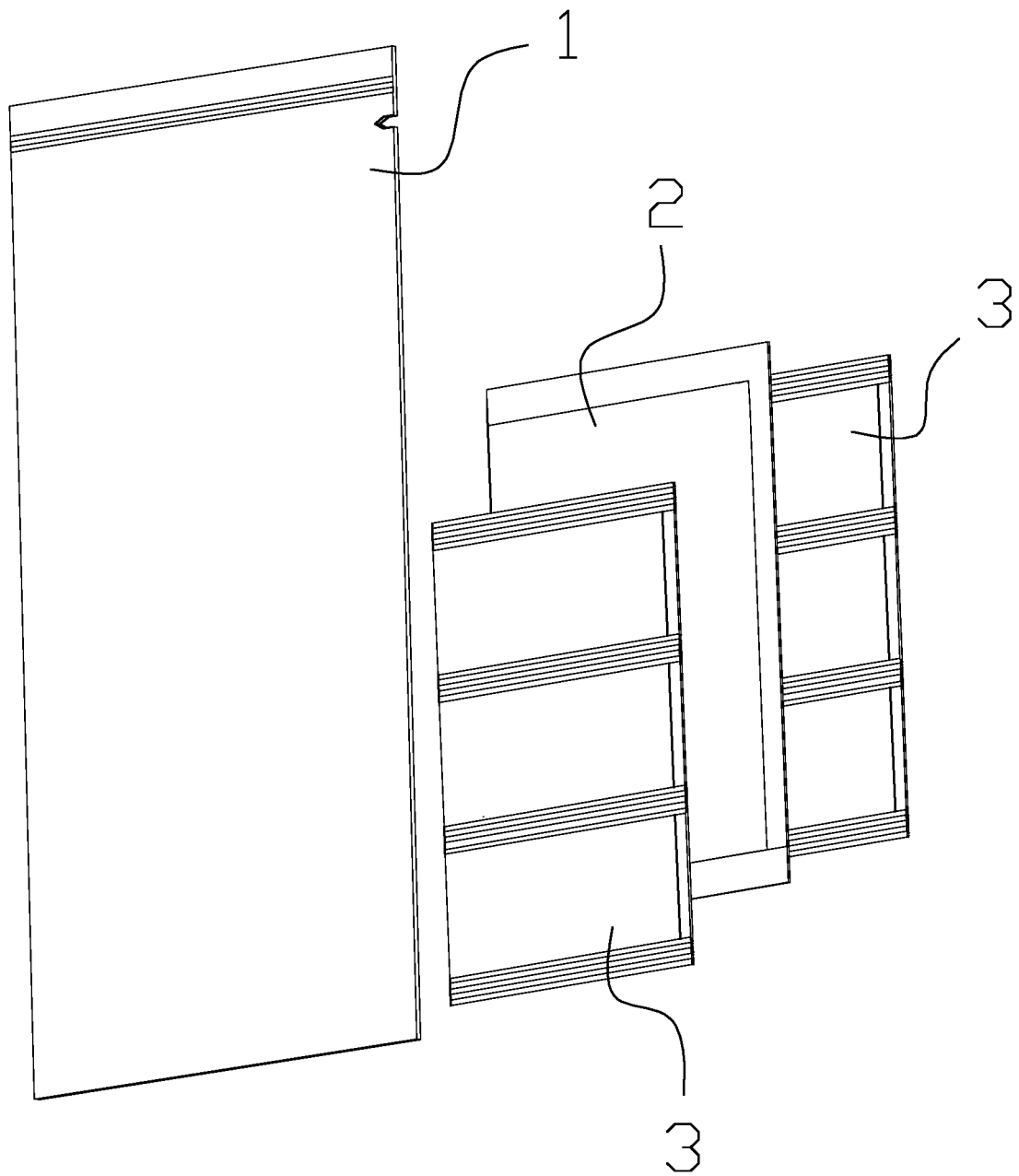
FIG. 3 is a detailed explosive view without a protective bag.
Figure 4:
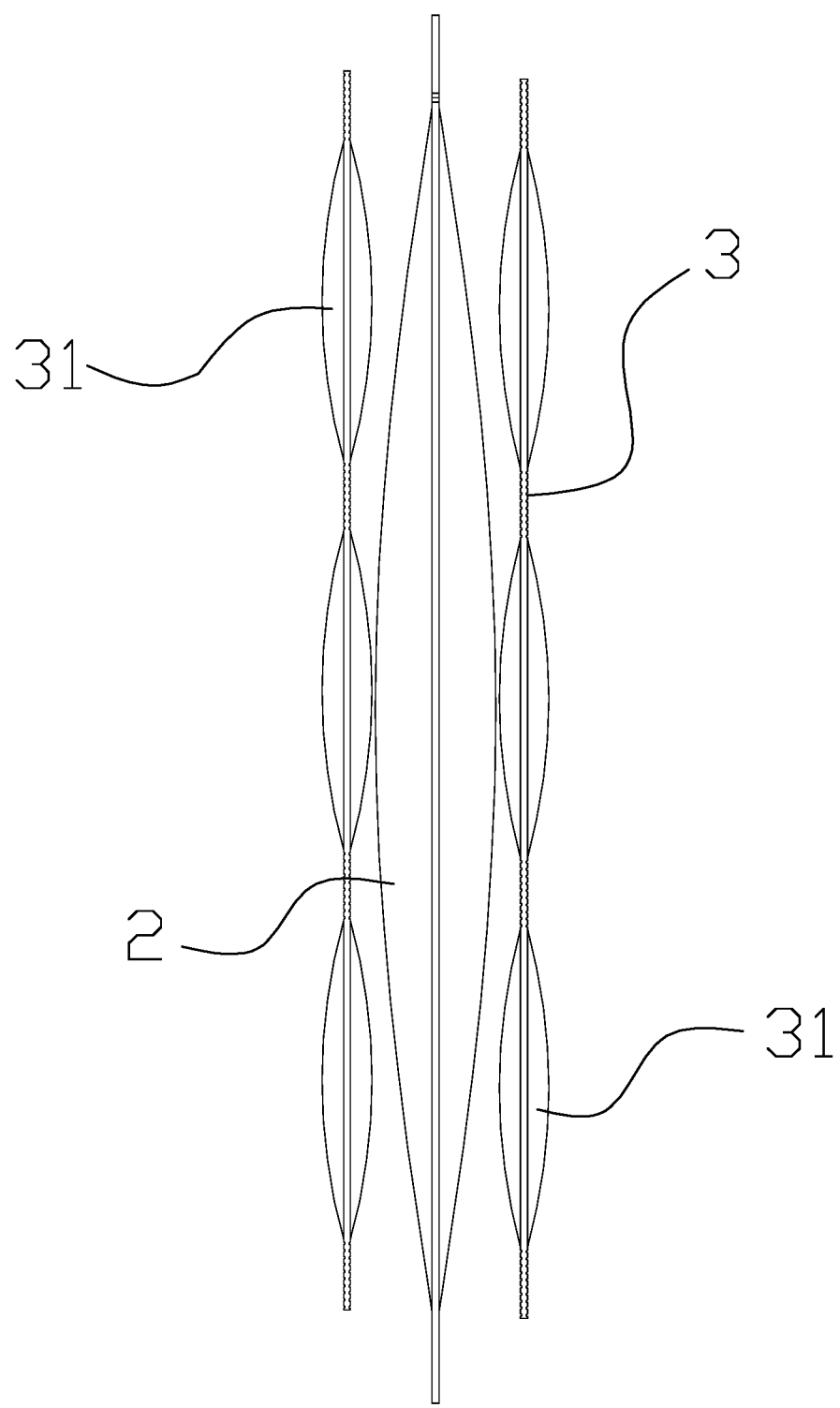
FIG. 4 is a profile projection of a relative position of a sealed packing food and two pieces of flameless automatic food heating agent bag without a protective bag and a heating bag.
Figure 5:
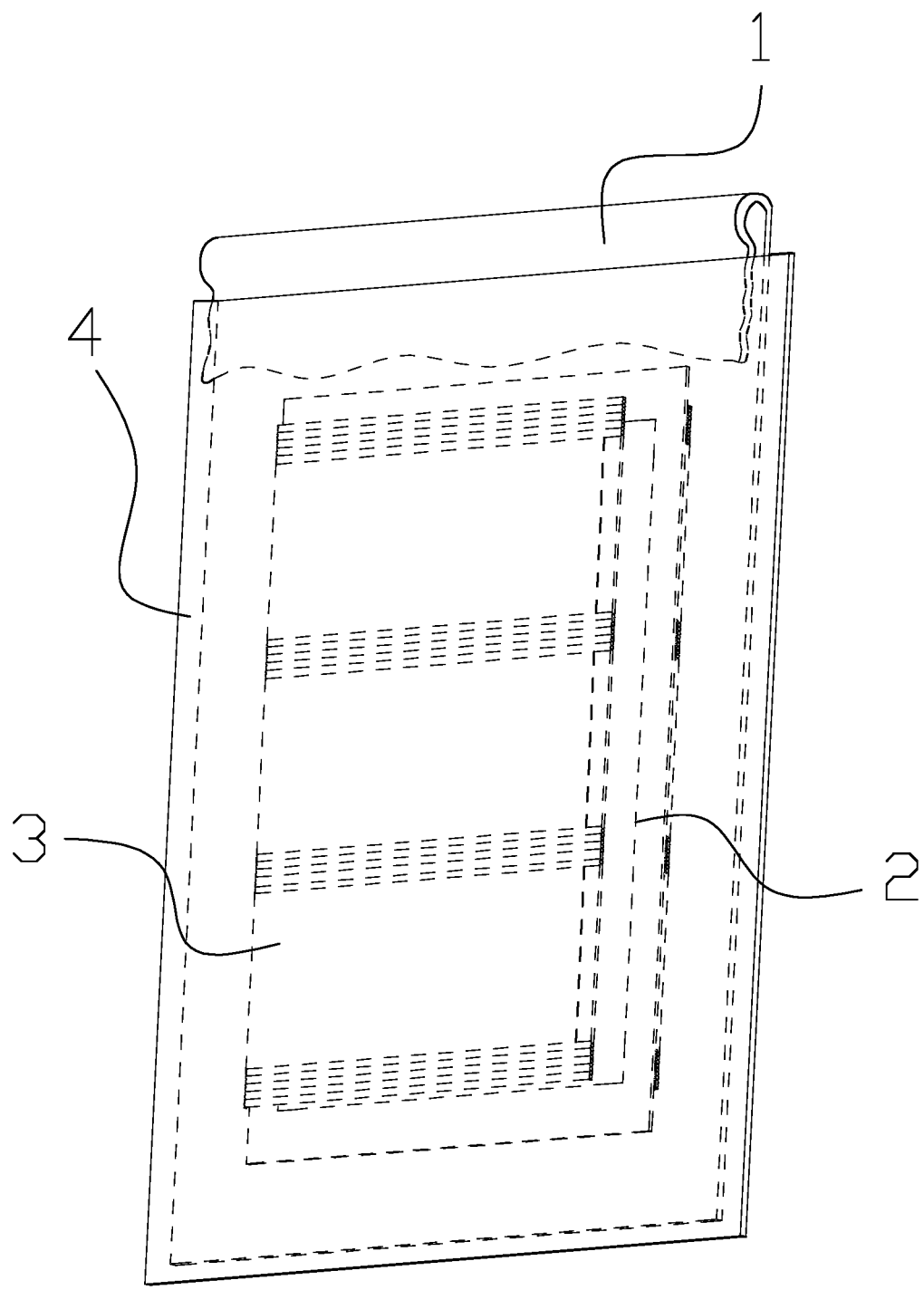
FIG. 5 is a perspective view of a bended opening of the heating bag being inserted into the protective bag for heating.
Figure 6:
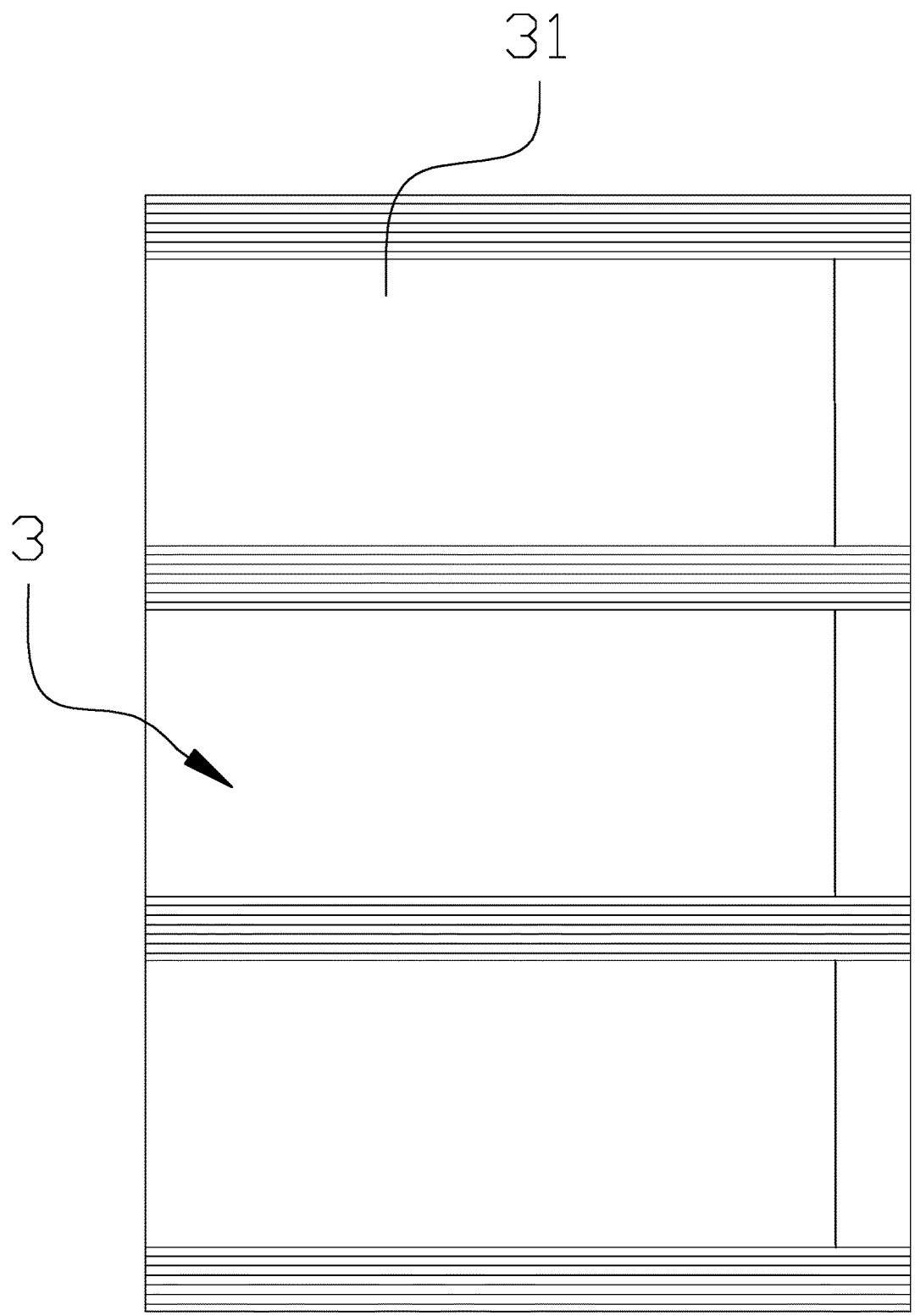
FIG. 6 is a projection of the flameless automatic food heating agent bag in the FIG. 1.

Referring to FIG. 1 to FIG. 6, according to a preferred embodiment of the present invention is illustrated, wherein the formula of the flameless automatic food heating agent is as follow: one part to five parts of aluminum powder, three parts to ten parts of carbon powder, five parts to twenty five parts of magnesium powder, ten parts to twenty five parts of iron powder and one parts to five parts of anticoagulant. The anticoagulant is able to be selected from a group consisting of sodium chloride, sodium citrate or potassium fluoride. The magnesium powder, the aluminum powder, the iron powder and the carbon powder are nanomaterial.

The method of heating food with the flameless automatic food heating agent comprises the following steps.

a) The preparing of the flameless automatic food heating agent: selecting a non-toxic bag which is able to absorb water and filer water molecules while keeping the solid powder; mixing all components to a mixed powder according to the formula of the flameless automatic food heating and put the mixed powder into a non-toxic bag; sealing the non-toxic bag to produce the flameless automatic food heating agent bag 3;

b) Placing two pieces of flameless automatic food heating agent bags 3 in two sides of a sealed food packaging 2 respectively; putting the sealed food packaging with the flameless automatic food heating agent bags into a waterproof heating bag 1; adding water into the water-proof heating bag 1 to let the flameless automatic food heating agent bags 3 to absorb water;

c) Bending an opening side of the water-proof heating bag 1 to seal the opening side; vaporizing water in the waterproof heating bag 1; placing the water-proof heating bag 1 for 10 to 15 minutes; heating food in the sealed food packaging 2 to 60° C. to 80° C.

Wherein the step b) further comprises the following steps, placing the water-proof heating bag 1 filled with water and two pieces of the flameless automatic food heating agent bags 3 in a protective bag 4 which is thermal keeping, burn-proof and heat insulating to absorb water and for heating; bending and inserting the opening side of the water-proof heating bag 1 into the protective bag 4 to automatically fix and seal an opening of the water-proof heating bag 1. The water-proof heating bag is a plastic bag which is able to endure a temperature of 150° C. to 160° C., a water-proof foam pouch or a rubber bag. The protective bag 4 is a foam pouch made of foam material. The flameless automatic food heating agent bag in the step a) comprise n small bags 31 which contain the mixed powder; the n is a natural number more than two. The water-proof heating bag is turned over every 5 minutes in the 10 to 15 minutes in the step c). The water is purified water, solution, turbid water or urine.

Producing the food adopts the present invention comprises the following steps, placing two pieces of flameless automatic food heating agent bags 3 in two sides of a sealed food packaging 2 respectively; putting the food packaging with the flameless automatic food heating agent bags into a water-proof heating bag 1; sealing the opening of the waterproof heating bag 1; cutting a notch on the opening of the water-proof heating bag 1 for conveniently peeling off; inserting a bottom of the water-proof heating bag 1 into the protective bag 4; placing fork, tissue and small water bag for heating between the protective bag 4 and the water-proof heating bag 1, which is convenient for carrying, ensuring a sealing of the flameless automatic food heating agent bag 3 and providing a handy fork, tissue and water for heating food. To heat food with the present invention comprises the following steps: taking out the fork, tissue and small water bag out of the protective bag 4; peeling off the water-proof heating bag 1 from the notch; pouring the water in the small water bag into the water-proof heating bag 1; bending the opening of the water-proof heating bag and inserting the water-proof heating bag into the protective bag 4; placing for 10 to 15 minutes; taking out the sealed packaging food 2 which is heated to around 65° C.

What is claimed is:

1. A method of heating foods with a flameless automatic food heating agent, comprising steps of:

a) preparing the flameless automatic food heating agent: selecting a non-toxic bag which absorbs water and filers water molecules while keeping solid powder; mixing all components to a mixed powder according to a formula of the flameless automatic food heating agent and putting the mixed powder into a non-toxic bag; sealing the non-toxic bag to produce flameless automatic food heating agent bags (3); wherein the formula of the flameless automatic food heating agent comprises one part to five parts of aluminum powder, three parts to ten parts of carbon powder, five parts to twenty five parts of magnesium powder, ten parts to twenty five parts of iron powder and one parts to five parts of anticoagulant, wherein the anticoagulants are selected from a group consisting of sodium chloride, sodium citrate and potassium fluoride;

b) placing two pieces of flameless automatic food heating agent bags (3) in two sides of a sealed food packaging (2) respectively; putting the sealed food packaging with the flameless automatic food heating agent bags (3) into a water-proof heating bag (1); adding water into the water-proof heating bag (1) to let the flameless automatic food heating agent bags (3) to absorb water; and c) bending an opening side of the water-proof heating bag (1) to seal the opening side; vaporizing water in the water-proof heating bag (1); placing the water-proof heating bag (1) for 10 to 15 minutes; heating food in the sealed food packaging (2) to 60° C. to 80° C.

2. The method as recited in claim 1, wherein the flameless automatic food heating agent bags (3) in the step a) comprise n small bags (31) which contain the mixed powder; the n is a natural number more than two.

3. The method as recited in claim 1, wherein the water is purified water, solution, turbid water or urine.

\* \* \* \* \*